(12) United States Patent
Mori et al.

(10) Patent No.: US 10,768,539 B2
(45) Date of Patent: Sep. 8, 2020

(54) ELECTROPHOTOGRAPHIC PHOTOSENSITIVE MEMBER, PRODUCTION METHOD THEREFOR, PROCESS CARTRIDGE, AND ELECTROPHOTOGRAPHIC IMAGE-FORMING APPARATUS

(71) Applicant: CANON KABUSHIKI KAISHA, Tokyo (JP)

(72) Inventors: Haruki Mori, Ichikawa (JP); Koichi Nakata, Tokyo (JP); Masaki Nonaka, Toride (JP); Shinji Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/416,929

(22) Filed: May 20, 2019

(65) Prior Publication Data

US 2019/0361365 A1 Nov. 28, 2019

(30) Foreign Application Priority Data

May 23, 2018 (JP) .................. 2018-099069

(51) Int. Cl.
 *G03G 5/07* (2006.01)
 *G03G 5/147* (2006.01)
 *G03G 5/05* (2006.01)
 *C08L 33/14* (2006.01)

(52) U.S. Cl.
 CPC ......... *G03G 5/14786* (2013.01); *G03G 5/055* (2013.01); *G03G 5/0525* (2013.01); *G03G 5/0546* (2013.01); *G03G 5/071* (2013.01); *G03G 5/14734* (2013.01); *G03G 5/14739* (2013.01); *C08L 33/14* (2013.01)

(58) Field of Classification Search
 CPC ........... G03G 5/14734; G03G 5/14739; G03G 5/0546; G03G 5/055; G03G 5/0592; G03G 5/071; G03G 5/14786
 See application file for complete search history.

(56) References Cited

U.S. PATENT DOCUMENTS

| | | |
|---|---|---|
| 7,186,489 B2 | 3/2007 | Uematsu et al. |
| 7,226,711 B2 | 6/2007 | Amamiya et al. |
| 7,333,752 B2 | 2/2008 | Kawahara et al. |
| 7,534,534 B2 | 5/2009 | Nakata et al. |
| 7,732,113 B2 | 6/2010 | Nakamura et al. |
| 7,910,274 B2 | 3/2011 | Tanaka et al. |
| 8,088,541 B2 | 1/2012 | Tanaka et al. |
| 8,343,699 B2 | 1/2013 | Nagasaka et al. |
| 8,415,078 B2 | 4/2013 | Tanaka et al. |
| 8,465,889 B2 | 6/2013 | Sekido et al. |
| 8,524,430 B2 | 9/2013 | Takagi et al. |
| 8,546,050 B2 | 10/2013 | Maruyama et al. |
| 8,632,931 B2 | 1/2014 | Sekido et al. |
| 8,783,209 B2 | 7/2014 | Kaku et al. |
| 8,795,936 B2 | 8/2014 | Sekido et al. |
| 8,865,382 B2 | 10/2014 | Nonaka et al. |
| 9,244,369 B2 | 1/2016 | Tanaka et al. |
| 9,316,931 B2 | 4/2016 | Takagi et al. |
| 9,389,523 B2 | 7/2016 | Nakata et al. |
| 9,594,318 B2 | 3/2017 | Nakata et al. |
| 9,740,117 B2 | 8/2017 | Kosaka et al. |
| 10,042,272 B2 | 8/2018 | Mori et al. |
| 10,120,331 B2 | 11/2018 | Nakata et al. |
| 10,310,395 B2 | 6/2019 | Nakata et al. |
| 2009/0226828 A1* | 9/2009 | De Jong ............... G03G 5/047 430/58.8 |
| 2018/0329317 A1 | 11/2018 | Mori et al. |
| 2018/0335708 A1 | 11/2018 | Nakata et al. |
| 2019/0049867 A1 | 2/2019 | Tokimitsu et al. |
| 2019/0056676 A1 | 2/2019 | Nakata et al. |
| 2019/0094726 A1 | 3/2019 | Mori et al. |

FOREIGN PATENT DOCUMENTS

| | | | |
|---|---|---|---|
| JP | 61262743 A | * 11/1986 | ............. G03G 5/055 |
| JP | 2000-66425 A | 3/2000 | |
| JP | 2000-212160 A | 8/2000 | |
| JP | 2012-14150 A | 1/2012 | |
| JP | 2014182186 A | * 9/2014 | |

OTHER PUBLICATIONS

English language machine translation of JP 2014-182186. (Year: 2014).*
English language machine translation of JP 62-126743 (Year: 1986).*
Alger, M.S.M. Polymer Science Dictionary. Essex: Elsevier Science Publishers, Ltd. p. 67 (Year: 1989).*
Oswal, S.L.; et al. Synthesis, Characterization and Thermal Properties of Copoly(maleimide-methylmethacrylate), Terpoly(maleimide-methylmethacrylate-acrylic Acid), and Terpoly(maleimide-methylmethacrylatemethylacrylic acid) Iranian Polymer Journal 13 (4) pp. 297-305 (Year: 2004).*
Jia, X.; Pang, Y.; Huang, J. "Copolymerization of Ethyl a-(Hydroxymethyl)acrylate with Maleimide and Characterization of the Resulting Copolymer". Journal of Polymer Science A 36 (8) pp. 1291-1299 (Year: 1998).*

(Continued)

*Primary Examiner* — Christopher D Rodee

(74) *Attorney, Agent, or Firm* — Venable LLP

(57) ABSTRACT

Provided is an electrophotographic photosensitive member that suppresses image smearing at the time of its repeated use, and expresses satisfactory wear resistance and electric characteristics. The electrophotographic photosensitive member includes a support and a photosensitive layer in the stated order, wherein a surface layer of the electrophotographic photosensitive member contains a copolymer of a hole-transportable compound having a chain-polymerizable functional group and a specific compound having maleimide groups.

14 Claims, 4 Drawing Sheets

(56) References Cited

OTHER PUBLICATIONS

U.S. Appl. No. 16/423,337, Yuka Ishiduka, filed May 28, 2019.
U.S. Appl. No. 16/423,418, Hiroyuki Watanabe, filed May 28, 2019.
U.S. Appl. No. 16/423,429, Nobuhiro Nakamura, filed May 28, 2019.
U.S. Appl. No. 16/430,860, Koichi Nakata, filed Jun. 4, 2019.
Minoura, et al., "The Preparation of Polymers by the Diels-Alder Reaction", J. Synth. Org. Chem. Jp., vol. 22, Iss. 1 (1964) (Partial Translation).

* cited by examiner

ELECTROPHOTOGRAPHIC PHOTOSENSITIVE MEMBER, PRODUCTION METHOD THEREFOR, PROCESS CARTRIDGE, AND ELECTROPHOTOGRAPHIC IMAGE-FORMING APPARATUS

BACKGROUND OF THE INVENTION

Field of the Invention

The present disclosure relates to an electrophotographic photosensitive member and a production method for the electrophotographic photosensitive member, and a process cartridge and an electrophotographic image-forming apparatus each including the electrophotographic photosensitive member.

Description of the Related Art

As an electrophotographic photosensitive member to be mounted onto an electrophotographic image-forming apparatus (hereinafter sometimes referred to as "electrophotographic apparatus"), there is known an organic electrophotographic photosensitive member (hereinafter referred to as "electrophotographic photosensitive member") containing an organic photoconductive substance (charge-generating substance), and a wide variety of investigations have heretofore been made on the electrophotographic photosensitive member. In recent years, for the purposes of lengthening a lifetime of the electrophotographic photosensitive member and improving image quality at the time of its repeated use, there has been a demand for an improvement in mechanical durability (wear resistance) of the electrophotographic photosensitive member, and many attempts have heretofore been made.

For example, in each of Japanese Patent Application Laid-Open No. 2000-66425 and Japanese Patent Application Laid-Open No. 2012-14150, there is a description of an electrophotographic photosensitive member containing, in its surface layer, a copolymer of a charge-transportable compound having a chain-polymerizable functional group and a compound having a plurality of acryloyloxy groups. Such electrophotographic photosensitive member expresses excellent wear resistance by virtue of containing the compound having a plurality of acryloyloxy groups in the surface layer.

SUMMARY OF THE INVENTION

However, according to an investigation made by the present inventors, the electrophotographic photosensitive member described in each of Japanese Patent Application Laid-Open No. 2000-66425 and Japanese Patent Application Laid-Open No. 2012-14150 has a risk in that an image failure (image smearing) may occur at the time of its repeated use in a high-humidity environment. Accordingly, an electrophotographic photosensitive member expressing excellent wear resistance like the above-mentioned electrophotographic photosensitive member has a problem with the suppression of image smearing occurring at the time of its repeated use. In addition, at the time of the repeated use, a change in image density due to a fluctuation in potential also needs to be suppressed, and hence there is a demand for an electrophotographic photosensitive member expressing stable electric characteristics from an initial stage onward. Therefore, an object of the present disclosure is to provide an electrophotographic photosensitive member that suppresses image smearing at the time of its repeated use, and expresses satisfactory wear resistance and electric characteristics, and a production method for the electrophotographic photosensitive member. Another object of the present disclosure is to provide a process cartridge and an electrophotographic apparatus each including the electrophotographic photosensitive member.

The above-mentioned objects are achieved by the following present disclosure. That is, according to one aspect of the present disclosure, there is provided an electrophotographic photosensitive member including in this order: a support; and a photosensitive layer, wherein a surface layer of the electrophotographic photosensitive member contains a copolymer of a hole-transportable compound having a chain-polymerizable functional group and a compound represented by the following formula (1):

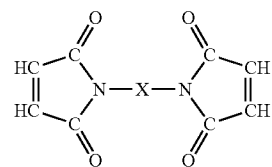

(1)

in the formula (1), X represents a divalent group obtained by removing two hydrogen atoms from a hydrocarbon having 2 or more and 18 or less carbon atoms.

According to another aspect of the present disclosure, there is provided a production method for an electrophotographic photosensitive member, the production method including: preparing a coating liquid for a surface layer containing a hole-transportable compound having a chain-polymerizable functional group and a compound represented by the following formula (1); forming a coat of the coating liquid for a surface layer; and curing the coat to form a surface layer of the electrophotographic photosensitive member:

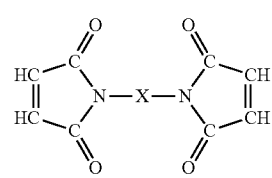

(1)

in the formula (1), X represents a divalent group obtained by removing two hydrogen atoms from a hydrocarbon having 2 or more and 18 or less carbon atoms.

According to another aspect of the present disclosure, there is provided a process cartridge including: the electrophotographic photosensitive member; and at least one unit selected from the group consisting of a charging unit, a developing unit, and a cleaning unit, the process cartridge integrally supporting the electrophotographic photosensitive member and the at least one unit, and being removably mounted onto a main body of an electrophotographic image-forming apparatus.

According to another aspect of the present disclosure, there is provided an electrophotographic image-forming apparatus including: the electrophotographic photosensitive member; and at least one unit selected from the group consisting of a charging unit, an exposing unit, a developing unit, and a transferring unit.

According to the present disclosure, the electrophotographic photosensitive member that suppresses image smearing at the time of its repeated use, and expresses satisfactory wear resistance and electric characteristics, and the production method for the electrophotographic photosensitive member can be provided. According to the present disclosure, the process cartridge and the electrophotographic image-forming apparatus each including the electrophotographic photosensitive member can also be provided.

Further features of the present invention will become apparent from the following description of exemplary embodiments with reference to the attached drawings.

DESCRIPTION OF THE EMBODIMENTS

Figure 1:
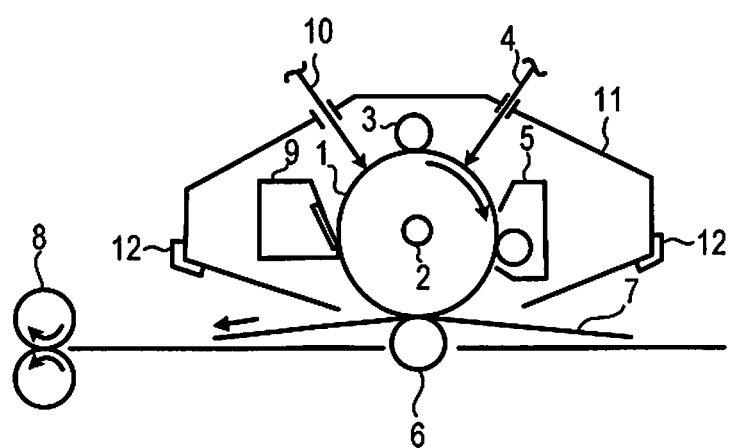
FIG. 1 is a view for illustrating an example of the schematic construction of an electrophotographic image-forming apparatus including a process cartridge including an electrophotographic photosensitive member of the present disclosure.

The present disclosure is described in detail below by way of a preferred embodiment.

An electrophotographic photosensitive member according to one aspect of the present disclosure includes a surface layer containing a copolymer of a hole-transportable compound having a chain-polymerizable functional group and a compound represented by the formula (1):

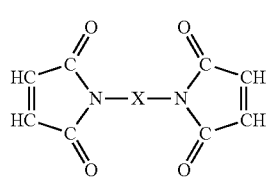

in the formula (1), X represents a divalent group obtained by removing two hydrogen atoms from a hydrocarbon having 2 or more and 18 or less carbon atoms.

The present inventors presume the reason why the effects of the present disclosure are expressed by having the above-mentioned feature to be as described below.

Image smearing occurs at the time of repeated use of an electrophotographic apparatus presumably because moisture adheres to the surface of the electrophotographic photosensitive member deteriorated by the influence of electric discharge, to thereby lower the resistance of the surface of the electrophotographic photosensitive member, with the result that an electrostatic latent image cannot be held on the surface of the electrophotographic photosensitive member. The electrophotographic photosensitive member described in each of Japanese Patent Application Laid-Open No. 2000-66425 and Japanese Patent Application Laid-Open No. 2012-14150 causes image smearing presumably because the degree of deterioration of the surface of the electrophotographic photosensitive member by the influence of electric discharge is large.

In addition, a fluctuation in potential at the time of the repeated use occurs presumably because a charge is caused to remain on the surface layer of the electrophotographic photosensitive member. For example, the charge is caused to remain presumably by the aggregation of a compound having no hole transportability in the surface layer.

The compound represented by the formula (1) contained in the surface layer of the electrophotographic photosensitive member of the present disclosure has two maleimide groups. It is generally known that the maleimide group has chain polymerizability. Accordingly, the compound can be copolymerized with the hole-transportable compound having a chain-polymerizable functional group. The copolymer adopts a three-dimensional crosslinked structure, and probably because of this, the electrophotographic photosensitive member of the present disclosure expresses excellent wear resistance.

Besides, the maleimide group is generally known to be an electron-withdrawing functional group, and has a markedly high oxidation potential, and hence it is considered that deterioration hardly occurs even under the influence of electric discharge. Accordingly, the electrophotographic photosensitive member of the present disclosure can suppress image smearing probably because the electrophotographic photosensitive member is reduced in degree of deterioration by the influence of electric discharge at the time of its repeated use by virtue of containing the compound represented by the formula (1) as a constituent component in the copolymer contained in the surface layer.

In addition, X in the compound represented by the formula (1) represents a divalent group obtained by removing two hydrogen atoms from a hydrocarbon having 2 or more and 18 or less carbon atoms. When the number of carbon atoms of the divalent group obtained by removing two hydrogen atoms from the hydrocarbon falls within this range, its compatibility with the other constituent component in the copolymer, namely the hole-transportable compound having a chain-polymerizable functional group is satisfactory. Accordingly, it is considered that the compound represented by the formula (1) achieves an appropriate dispersion state without aggregating in the surface layer. Therefore, it is considered that the electrophotographic photosensitive member of the present disclosure hardly causes the retention of a charge at the time of its repeated use, and can suppress a fluctuation in potential.

Through such mechanism as described above, the copolymer of the hole-transportable compound having a chain-polymerizable functional group and the compound represented by the formula (1) contained in the surface layer of the electrophotographic photosensitive member of the present disclosure exhibits a synergistic effect, and thus the effects of the present disclosure can be achieved.

X in the compound represented by the formula (1) has preferably 6 or more and 18 or less carbon atoms, more preferably 6 or more and 12 or less carbon atoms. In this case, more satisfactory electric characteristics are obtained.

The hydrocarbon is preferably a saturated hydrocarbon, more preferably a chain saturated hydrocarbon, still more preferably a chain saturated hydrocarbon having 6 or more and 12 or less carbon atoms. In this case, still more satisfactory electric characteristics are obtained.

The compound represented by the formula (1) is preferably a compound represented by the formula (2):

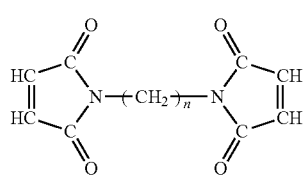

(2)

in the formula (2), "n" represents an integer of 6 or more and 12 or less.

The compound represented by the formula (2) has more improved compatibility with the hole-transportable compound having chain polymerizability, and hence the electrophotographic photosensitive member of the present disclosure obtains more satisfactory electric characteristics.

The compound represented by the formula (1) may be synthesized using a synthesis method described in, for example, Japanese Patent Application Laid-Open No. 2000-212160.

Specific examples of the compound represented by the formula (1) (Exemplified Compounds 1-1 to 1-25) are given below, but the present disclosure is not limited thereto.

1-1
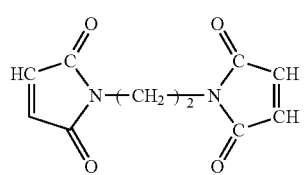

1-2
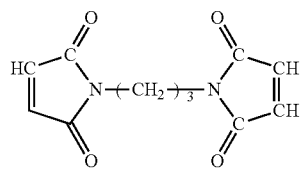

1-3
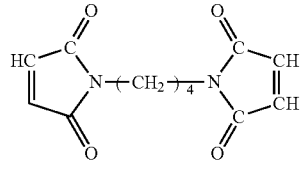

1-4
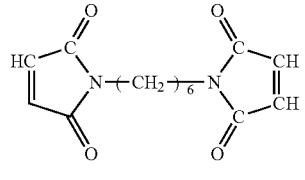

-continued 1-5
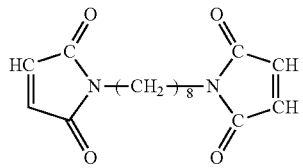

1-6
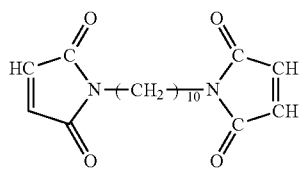

1-7
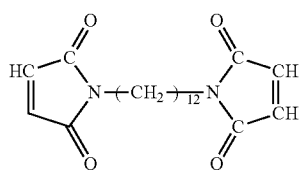

1-8
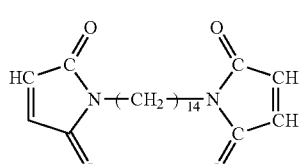

1-9
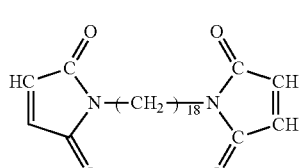

1-10
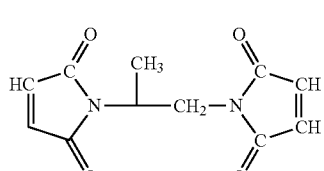

1-11
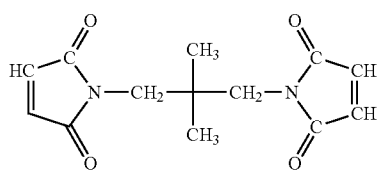

1-12
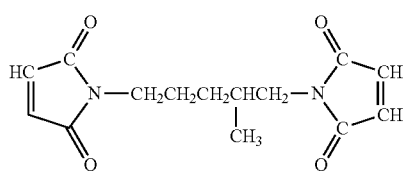

1-13
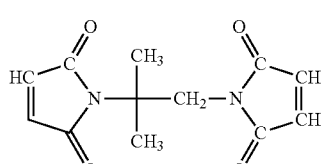

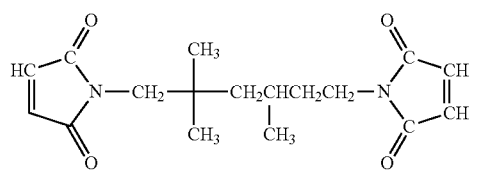

1-14

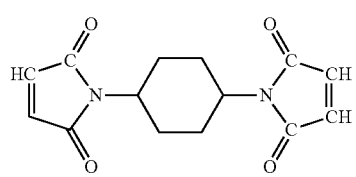

1-15

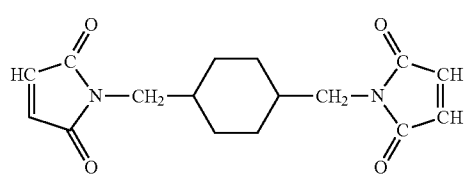

1-16

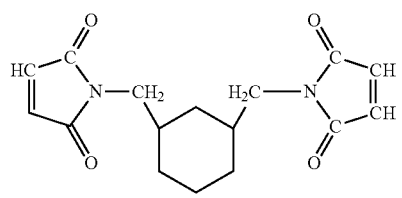

1-17

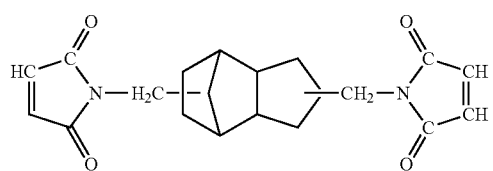

1-18

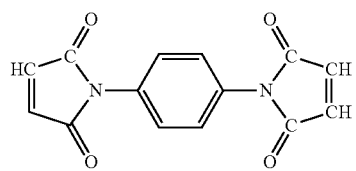

1-19

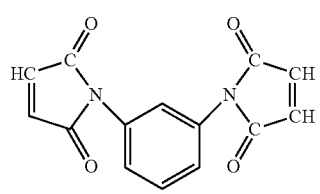

1-20

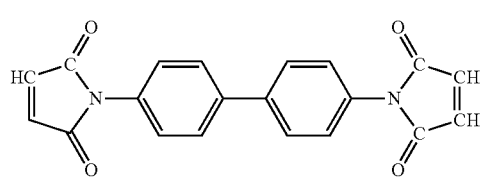

1-21

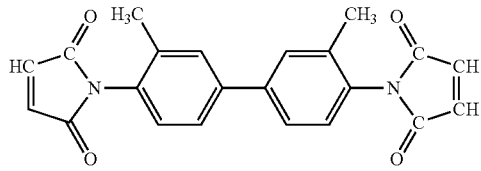

1-22

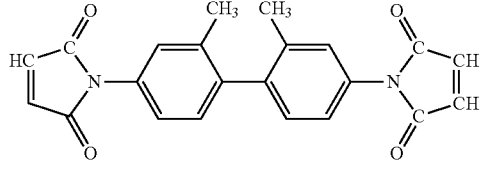

1-23

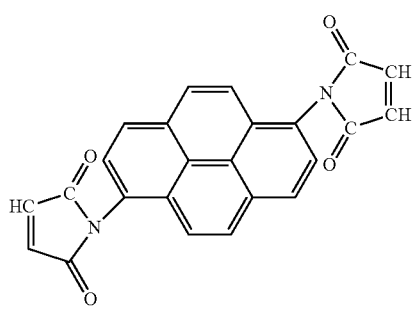

1-24

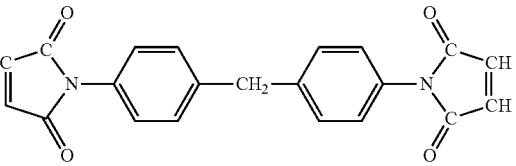

1-25

In the present disclosure, the chain-polymerizable functional group means a functional group capable of chain polymerization. The chain polymerization refers to, when reactions for producing polymer compounds are broadly classified into chain polymerization and sequential polymerization, the former polymerization reaction mode. A structure having a vinyl group or the like serves as the chain-polymerizable functional group, and specific examples thereof include a vinyl group, an acryloyloxy group, a methacryloyloxy group, and a styryl group.

The chain-polymerizable functional group of the hole-transportable compound is preferably selected from an acryloyloxy group and a methacryloyloxy group. In this case, its compatibility with the compound represented by the formula (1) is improved, and more satisfactory electric characteristics are obtained.

The number of chain-polymerizable functional groups of the hole-transportable compound is preferably 2.

In this case, the wear resistance and electric characteristics of the electrophotographic photosensitive member can both be achieved at more satisfactory levels.

The contents of the hole-transportable compound having a chain-polymerizable functional group and the compound represented by the formula (1) in the copolymer preferably satisfy the following expression (3), where Wa and Ma represent the contained mass and the molecular weight, respectively, of the hole-transportable compound having a chain-polymerizable functional group, and Wb and Mb represent the contained mass and the molecular weight, respectively, of the compound represented by the formula (1). The expression (3) represents a preferred range of the molar fraction of the compound represented by the formula (1) in the constituent components of the copolymer. When the molar fraction of the compound represented by the formula (1) in the constituent components of the copolymer falls within this range, the suppressing effect on image smearing and electric characteristics of the electrophotographic photosensitive member can both be achieved at more satisfactory levels.

$$0.05 \leq (Wb/Mb)/\{(Wa/Ma)+(Wb/Mb)\} \leq 0.50 \quad \text{Expression (3)}$$

In addition, the surface layer of the electrophotographic photosensitive member of the present disclosure may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

When the surface layer contains the additive, the content of the additive in the composition of the surface layer is preferably 50 mass % or less.

The average thickness of the surface layer is preferably 0.5 µm or more and 10 µm or less, more preferably 1 µm or more and 7 µm or less.

The surface layer of the electrophotographic photosensitive member of the present disclosure may be formed through the steps of: preparing a coating liquid for a surface layer containing the hole-transportable compound having a chain-polymerizable functional group and the compound represented by the formula (1); forming a coat of the coating liquid for a surface layer; and curing the coat.

The following expression (3) is preferably satisfied, where Wa and Ma represent the contained mass and the molecular weight, respectively, of the hole-transportable compound having a chain-polymerizable functional group contained in the coating liquid for a surface layer, and Wb and Mb represent the contained mass and the molecular weight, respectively, of the compound represented by the formula (1) contained therein. These numerical values represent a preferred range of the molar fraction of the compound represented by the formula (1) in the coating liquid for a surface layer. When the molar fraction of the compound represented by the formula (1) in the coating liquid for a surface layer falls within this range, a surface layer of an electrophotographic photosensitive member capable of achieving both the suppressing effect on image smearing and electric characteristics at more satisfactory levels can be formed.

$$0.05 \leq (Wb/Mb)/\{(Wa/Ma)+(Wb/Mb)\} \leq 0.50 \quad \text{Expression (3)}$$

A solvent that does not dissolve a layer to be arranged below the surface layer is preferably used as a solvent to be used for the preparation of the coating liquid for a surface layer. An alcohol-based solvent, such as methanol, ethanol, propanol, isopropanol, 1-butanol, 2-butanol, or 1-methoxy-2-propanol, is more preferred.

As a method of applying the coating liquid for a surface layer, there are given, for example, dip coating, spray coating, inkjet coating, roll coating, die coating, blade coating, curtain coating, wire bar coating, and ring coating. Of those, a method using dip coating is preferred from the viewpoints of efficiency and productivity.

As a method of curing the coat of the coating liquid for a surface layer, there is given a method involving curing the coat with heat, UV light, or electron beams. In order to maintain the strength of the surface layer and the durability of the electrophotographic photosensitive member, the coat is preferably cured using UV light or electron beams.

The coat is preferably polymerized using electron beams because an extremely dense (high-density) cured product (three-dimensional crosslinked structure) is obtained, and hence a surface layer having higher durability is obtained. When the coat is irradiated with electron beams, as an accelerator, there are given, for example, a scanning type, an electrocurtain type, a broad-beam type, a pulse type, and a laminar type.

When electron beams are used, the acceleration voltage of the electron beams is preferably 120 kV or less from the viewpoint that the deterioration of material characteristics due to the electron beams can be suppressed without impairing polymerization efficiency. In addition, the absorbed dose of the electron beams at the surface of the coat of the coating liquid for a surface layer is preferably 1 kGy or more and 50 kGy or less, more preferably 5 kGy or more and 10 kGy or less.

In addition, when the coat is cured (polymerized) using electron beams, it is preferred that the coat be irradiated with the electron beams in an inert gas atmosphere and then heated in an inert gas atmosphere for the purpose of suppressing the polymerization-inhibiting action of oxygen. Examples of the inert gas include nitrogen, argon, and helium.

In addition, after the irradiation with UV light or electron beams, the electrophotographic photosensitive member is preferably heated to 100° C. or more and 170° C. or less. With this, a surface layer that has still higher durability and suppresses an image failure is obtained.

Next, the construction of the electrophotographic photosensitive member of the present disclosure is described. In addition, while each construction of the electrophotographic photosensitive member is described, a production method therefor is also described.

[Electrophotographic Photosensitive Member]

An electrophotographic photosensitive member according to one aspect of the present disclosure includes a support, a photosensitive layer, and a surface layer (protective layer) in the stated order.

Figure 2:
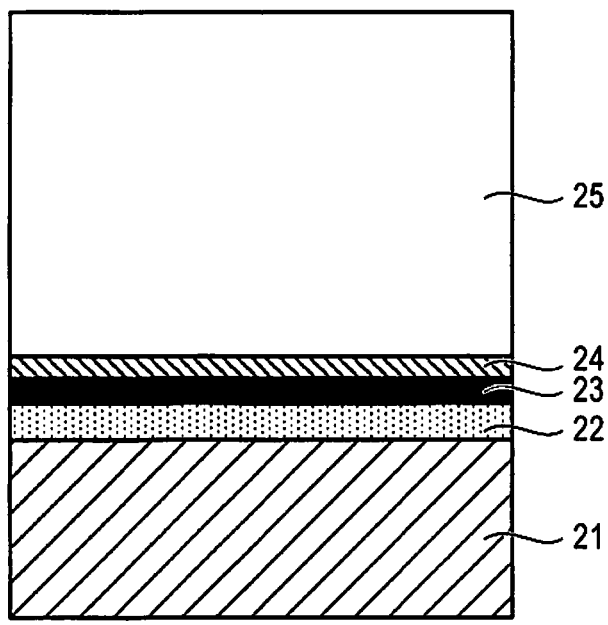
FIG. 2 is a view for illustrating an example of the layer construction of the electrophotographic photosensitive member of the present disclosure.

FIG. 2 is a view for illustrating an example of the layer construction of the electrophotographic photosensitive member. In FIG. 2, the electrophotographic photosensitive member includes a support 21, an undercoat layer 22, a charge-generating layer 23, a charge-transporting layer 24, and a protective layer 25. In this case, the charge-generating layer 23 and the charge-transporting layer 24 constitute the photosensitive layer, and the protective layer 25 serves as the surface layer.

A method of producing the electrophotographic photosensitive member is, for example, a method involving: preparing coating liquids for the respective layers to be described later; applying the liquids in a desired layer order; and drying the liquids. At this time, any of the methods given as the above-mentioned method of applying the coating liquid for a surface layer may be used as a method of applying each of the liquids. Of those, dip coating is preferred from the viewpoints of efficiency and productivity.

The support and the respective layers are described below.

<Support>

The electrophotographic photosensitive member of the present disclosure includes the support. The support is preferably a conductive support having conductivity. In addition, examples of the shape of the support include a cylindrical shape, a belt shape, and a sheet shape. Of those, a cylindrical support is preferred. In addition, the surface of the support may be subjected to, for example, an electrochemical treatment, such as anodization, a blast treatment, or a cutting treatment.

A metal, a resin, glass, or the like is preferred as a material for the support.

Examples of the metal include aluminum, iron, nickel, copper, gold, and stainless steel, and alloys thereof. Of those, an aluminum support using aluminum is preferred.

In addition, conductivity may be imparted to the resin or the glass through a treatment involving, for example, mixing or coating the resin or the glass with a conductive material.

<Conductive Layer>

In the present disclosure, a conductive layer may be arranged on the support. The arrangement of the conductive layer can conceal flaws and irregularities in the surface of the support, and control the reflection of light on the surface of the support.

The conductive layer preferably contains conductive particles and a resin.

A material for the conductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particles, and in particular, titanium oxide, tin oxide, and zinc oxide are more preferably used.

When the metal oxide is used as the conductive particles, the surface of the metal oxide may be treated with a silane coupling agent or the like, or the metal oxide may be doped with an element, such as phosphorus or aluminum, or an oxide thereof.

In addition, each of the conductive particles may be of a laminated construction having a core particle and a coating layer coating the particle. Examples of the core particle include titanium oxide, barium sulfate, and zinc oxide. The coating layer is, for example, a metal oxide, such as tin oxide.

In addition, when the metal oxide is used as the conductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, resin particles, or titanium oxide.

The average thickness of the conductive layer is preferably 1 μm or more and 50 μm or less, particularly preferably 3 μm or more and 40 μm or less.

The conductive layer may be formed by: preparing a coating liquid for a conductive layer containing the above-mentioned respective materials and a solvent; forming a coat of the liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the conductive particles in the coating liquid for a conductive layer, there are given methods using a paint shaker, a sand mill, a ball mill, and a liquid collision-type high-speed disperser.

<Undercoat Layer>

In the present disclosure, an undercoat layer may be arranged on the support or the conductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form an undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The average thickness of the undercoat layer is preferably 0.1 μm or more and 50 μm or less, more preferably 0.2 μm or more and 40 μm or less, particularly preferably 0.3 μm or more and 30 μm or less.

The undercoat layer may be formed by: preparing a coating liquid for an undercoat layer containing the above-mentioned respective materials and a solvent; forming a coat of the liquid; and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layers of electrophotographic photosensitive members are mainly classified into (1) a laminated photosensitive layer and (2) a single-layer photosensitive layer. (1) The laminated photosensitive layer has a charge-generating layer containing a charge-generating substance and a charge-transporting layer containing a charge-transporting substance. (2) The single-layer photosensitive layer is a photosensitive layer containing both a charge-generating substance and a charge-transporting substance.

(1) Laminated Photosensitive Layer

The laminated photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The average thickness of the charge-generating layer is preferably 0.1 µm or more and 1 µm or less, more preferably 0.15 µm or more and 0.4 µm or less.

The charge-generating layer may be formed by: preparing a coating liquid for a charge-generating layer containing the above-mentioned respective materials and a solvent; forming a coat of the liquid; and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the charge-transporting layer is preferably 5 µm or more and 50 µm or less, more preferably 8 µm or more and 40 µm or less, particularly preferably 10 µm or more and 30 µm or less.

The charge-transporting layer may be formed by: preparing a coating liquid for a charge-transporting layer containing the above-mentioned respective materials and a solvent; forming a coat of the liquid; and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Single-Layer Photosensitive Layer

The single-layer photosensitive layer may be formed by: preparing a coating liquid for a photosensitive layer containing the charge-generating substance, the charge-transporting substance, a resin, and a solvent; forming a coat of the liquid; and drying the coat. Examples of the charge-generating substance, the charge-transporting substance, and the resin are the same as those of the materials in the section "(1) Laminated Photosensitive Layer."

The average thickness of the single-layer photosensitive layer is preferably 5 µm or more and 50 µm or less, more preferably 8 µm or more and 40 µm or less, particularly preferably 10 µm or more and 30 µm or less.

<Protective Layer>

The protective layer may be formed, as described above, through the steps of: preparing a coating liquid for a surface layer; forming a coat of the coating liquid for a surface layer on the photosensitive layer; and curing the coat.

[Method of Forming Surface Shape of Electrophotographic Photosensitive Member]

For the purpose of further stabilizing the behavior of a cleaning blade to be brought into contact with the electrophotographic photosensitive member, it is more preferred that depressed portions or projected portions be formed on the surface layer of the electrophotographic photosensitive member.

The depressed portions or the projected portions may be formed over the entirety of the surface of the electrophotographic photosensitive member, or may be formed on part of the surface of the electrophotographic photosensitive member. When the depressed portions or the projected portions are formed on part of the surface of the electrophotographic photosensitive member, it is preferred that the depressed portions or the projected portions be formed at least over the entirety of a region with which the cleaning blade is to be brought into contact.

For example, when the depressed portions are formed, the depressed portions may be formed by bringing a mold having projections corresponding to the depressed portions to be formed into pressure contact with the surface of the electrophotographic photosensitive member to perform shape transfer.

Figure 3:
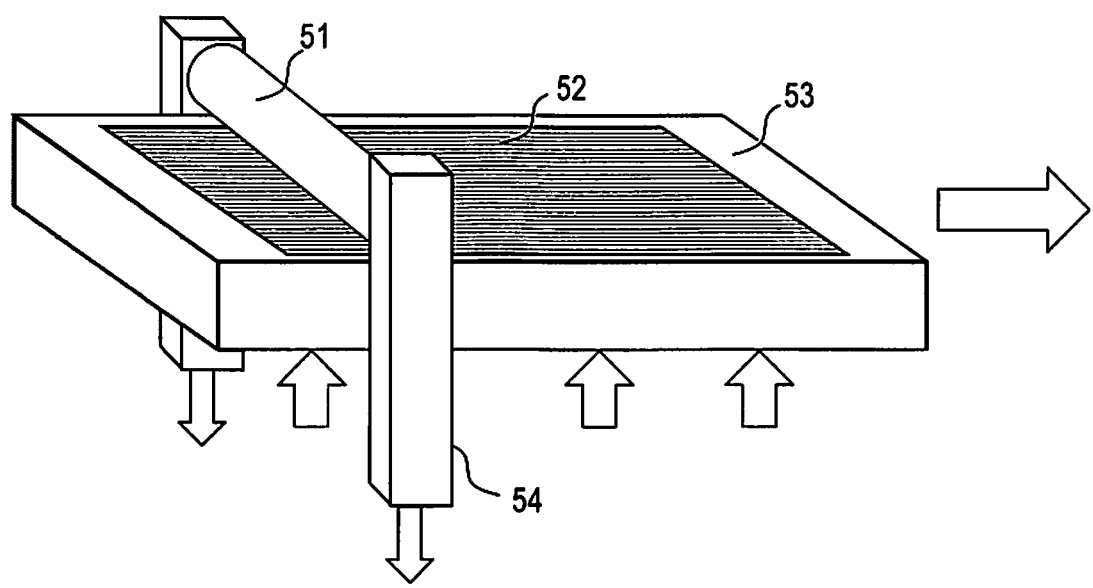
FIG. 3 is a view for illustrating an example of a pressure-contact shape transfer processing apparatus configured to form depressed portions on the surface of the electrophotographic photosensitive member of the present disclosure.

FIG. 3 is an illustration of an example of a pressure-contact shape transfer processing apparatus configured to form depressed portions on the surface of the electrophotographic photosensitive member.

The pressure-contact shape transfer processing apparatus illustrated in FIG. 3 is configured such that, while an electrophotographic photosensitive member 51 serving as an object to be processed is rotated, a mold 52 is continuously brought into contact with its surface (circumferential surface) to pressurize the surface, and thus depressed portions or flat portions can be formed on the surface of the electrophotographic photosensitive member 51.

As a material for a pressurizing member 53, there are given, for example, a metal, a metal oxide, a plastic, and glass. Of those, stainless steel (SUS) is preferred from the viewpoints of mechanical strength, dimensional accuracy, and durability. The mold 52 is placed on the upper surface of the pressurizing member 53. In addition, a supporting member (not shown) and a pressurizing system (not shown) that are placed on a lower surface side allow the mold 52 to be brought into contact at a predetermined pressure with the surface of the electrophotographic photosensitive member 51 supported by a supporting member 54. In addition, the supporting member 54 may be pressed against the pressurizing member 53 at a predetermined pressure, or the supporting member 54 and the pressurizing member 53 may be pressed against each other.

The example illustrated in FIG. 3 is an example in which the pressurizing member 53 is moved in a direction perpendicular to the axial direction of the electrophotographic photosensitive member 51, to thereby continuously process its surface while the electrophotographic photosensitive member 51 follows the movement or is driven to rotate. Further, the surface of the electrophotographic photosensitive member 51 may also be continuously processed by fixing the pressurizing member 53 and moving the supporting member 54 in a direction perpendicular to the axial direction of the electrophotographic photosensitive member 51, or by moving both of the supporting member 54 and the pressurizing member 53.

From the viewpoint of efficiently performing the shape transfer, the mold 52 and the electrophotographic photosensitive member 51 are preferably heated.

Examples of the mold 52 include: a metal having a finely processed surface; a product obtained by patterning the surface of a resin film, a silicon wafer, or the like with a resist; and a product obtained by applying a metal coating to a resin film having dispersed therein fine particles or a resin film having a fine surface shape.

In addition, from the viewpoint of uniformizing the pressure at which the mold 52 is pressed against the electrophotographic photosensitive member 51, it is preferred that an elastic body be placed between the mold 52 and the pressurizing member 53.

[Process Cartridge and Electrophotographic Apparatus]

A process cartridge of the present disclosure integrally supports the electrophotographic photosensitive member of the present disclosure, and at least one unit selected from the group consisting of a charging unit, a developing unit, and a cleaning unit, and is removably mounted onto the main body of an electrophotographic apparatus.

In addition, an electrophotographic apparatus of the present disclosure includes the electrophotographic photosensitive member of the present disclosure, and at least one unit selected from the group consisting of a charging unit, an exposing unit, a developing unit, and a transferring unit.

An example of the schematic construction of an electrophotographic image-forming apparatus including a process cartridge including an electrophotographic photosensitive member is illustrated in FIG. 1.

A cylindrical electrophotographic photosensitive member 1 is rotationally driven about a shaft 2 in a direction indicated by the arrow at a predetermined peripheral speed. The surface of the electrophotographic photosensitive member 1 is charged to a predetermined positive or negative potential by a charging unit 3. In FIG. 1, a roller charging system based on a roller-type charging member is illustrated, but a charging system such as a corona charging system, a proximity charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and hence a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to a treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. In addition, a so-called cleaner-less system configured to remove the deposit with the developing unit 5 or the like without separate arrangement of the cleaning unit 9 may be used. The electrophotographic image-forming apparatus may include an electricity-removing mechanism configured to subject the surface of the electrophotographic photosensitive member 1 to an electricity-removing treatment with pre-exposure light 10 from a pre-exposing unit (not shown). In addition, a guiding unit 12, such as a rail, may be arranged for removably mounting a process cartridge 11 of the present disclosure onto the main body of an electrophotographic image-forming apparatus.

The electrophotographic photosensitive member of the present disclosure can be used in, for example, a laser beam printer, an LED printer, a copying machine, a facsimile, and a multifunctional peripheral thereof.

EXAMPLES

The present disclosure is described in more detail below by way of Examples and Comparative Examples. The present disclosure is by no means limited to the following Examples, and various modifications may be made without departing from the gist of the present disclosure. In the following Examples, "part(s)" is by mass unless otherwise specified.

Example 1

An aluminum cylinder having a diameter of 30 mm, a length of 357.5 mm, and a thickness of 1 mm was used as a support (conductive support).

Next, 100 parts of zinc oxide particles (specific surface area: 19 $m^2/g$, powder resistivity: $4.7 \times 10^6$ Ω·cm) were mixed with 500 parts of toluene under stirring. 0.8 Part of a silane coupling agent was added to the mixture, and the whole was stirred for 6 hours. After that, toluene was evaporated under reduced pressure, and the residue was heated to dryness at 130° C. for 6 hours. Thus, surface-treated zinc oxide particles were obtained. KBM602 manufactured by Shin-Etsu Chemical Co., Ltd. (compound name: N-2-(aminoethyl)-3-aminopropylmethyldimethoxysilane) was used as the silane coupling agent.

Next, 15 parts of a polyvinyl butyral resin (product name: BM-1, manufactured by Sekisui Chemical Co., Ltd., weight-average molecular weight: 40,000) serving as a polyol resin and 15 parts of a blocked isocyanate (product name: Sumidur 3175, manufactured by Sumika Covestro Urethane Co., Ltd. (formerly Sumika Bayer Urethane Co., Ltd.)) were dissolved in a mixed solution of 73.5 parts of methyl ethyl ketone and 73.5 parts of 1-butanol. 80.8 Parts of the surface-treated zinc oxide particles and 0.8 part of 2,3,4-trihydroxybenzophenone (manufactured by Tokyo Chemical Industry Co., Ltd.) were added to the solution. The mixture was subjected to dispersion under an atmosphere at 23±3° C. for 3 hours with a sand mill apparatus using glass beads each having a diameter of 0.8 mm. After the dispersion, 0.01 part of a silicone oil (product name: SH28PA, manufactured by Dow Corning Toray Co., Ltd.) and 5.6 parts of crosslinked polymethyl methacrylate (PMMA) particles (product name: TECHPOLYMER SSX-103, manufactured by Sekisui Plastics Co., Ltd., average primary particle diameter: 3 μm) were added, and the mixture was stirred to prepare a coating liquid for an undercoat layer.

The coating liquid for an undercoat layer was applied onto the aluminum cylinder by dip coating to form a coat, and the resultant coat was dried for 40 minutes at 160° C. to form an undercoat layer having a thickness of 18 μm.

Next, a hydroxygallium phthalocyanine crystal of a crystal form having strong peaks at Bragg angles 2θ±0.2° in CuKα characteristic X-ray diffraction of 7.4° and 28.2° was prepared. 20 Parts of the hydroxygallium phthalocyanine crystal, 0.2 part of a compound represented by the following formula (A), 10 parts of a polyvinyl butyral resin (product name: S-LEC BX-1, manufactured by Sekisui Chemical Co., Ltd.), and 600 parts of cyclohexanone were dispersed with a sand mill apparatus using glass beads each having a diameter of 1 mm for 4 hours. After that, 700 parts of ethyl acetate was added to prepare a coating liquid for a charge-generating layer. The coating liquid for a charge-generating layer was applied onto the undercoat layer by dip coating to form a coat, and the resultant coat was heated to dryness in an oven having a temperature of 80° C. for 15 minutes to form a charge-generating layer having a thickness of 0.17 μm.

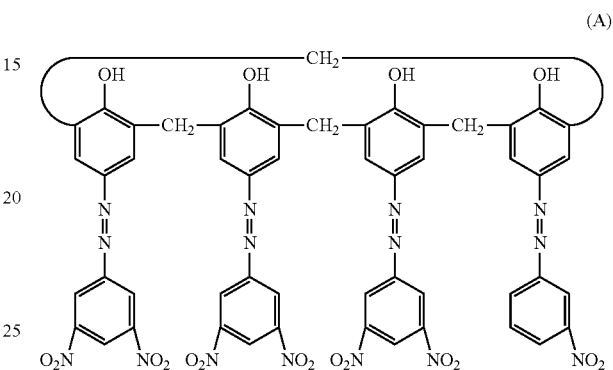

(A)

Next, 30 parts of a compound represented by the following formula (B) (charge-transporting substance), 60 parts of a compound represented by the following formula (C) (charge-transporting substance), 10 parts of a compound represented by the following formula (D), 100 parts of a polycarbonate resin (product name: Iupilon Z400, manufactured by Mitsubishi Engineering-Plastics Corporation, bisphenol Z type), and 0.02 part of polycarbonate having structural units represented by the following formula (E) (viscosity-average molecular weight Mv: 20,000) were dissolved in a mixed solvent of 600 parts of xylene and 200 parts of dimethoxymethane to prepare a coating liquid for a charge-transporting layer. The coating liquid for a charge-transporting layer was applied onto the charge-generating layer by dip coating to form a coat, and the resultant coat was dried for 30 minutes at 100° C. to form a charge-transporting layer having a thickness of 18 μm.

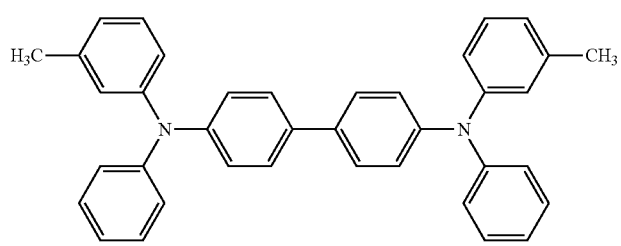

(B)

-continued

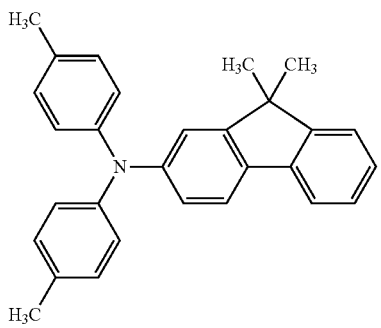
(C)

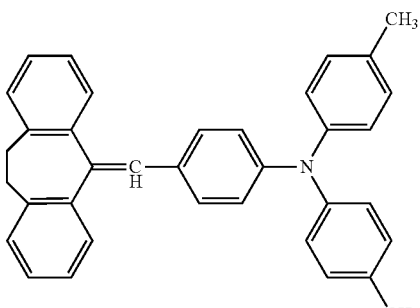
(D)

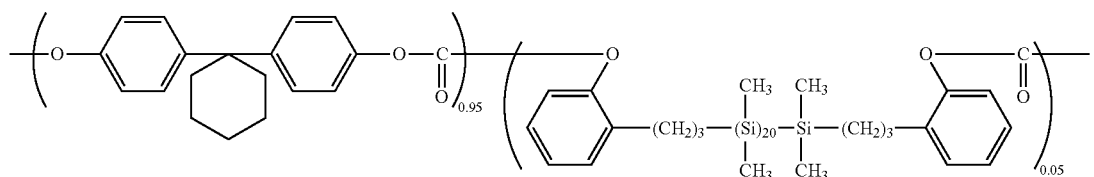
(E)

In the formula (E), 0.95 and 0.05 represent the molar ratios (copolymerization ratios) of the two structural units.

Next, 11 parts of Exemplified Compound (1-4) shown in the foregoing, 59 parts of a hole-transportable compound having a chain-polymerizable functional group represented by the following formula (F), 30 parts of polytetrafluoroethylene particles (Lubron L-2, manufactured by Daikin Industries, Ltd.), 1.5 parts of a fluorine atom-containing resin (product name: GF300, manufactured by Toagosei Co., Ltd.), 100 parts of 1-propanol, and 100 parts of 1,1,2,2,3,3,4-heptafluorocyclopentane (product name: ZEORORA H, manufactured by Zeon Corporation) were mixed, and then the resultant solution was subjected to a dispersion treatment with an ultrahigh-speed disperser. After that, the solution was filtered through a polyflon filter (product name: PF-060, manufactured by Advantec Toyo Kaisha, Ltd.) to prepare a coating liquid for a surface layer. In the resultant coating liquid for a surface layer, (Wb/Mb)/{(Wa/Ma)+(Wb/Mb)} was 0.25.

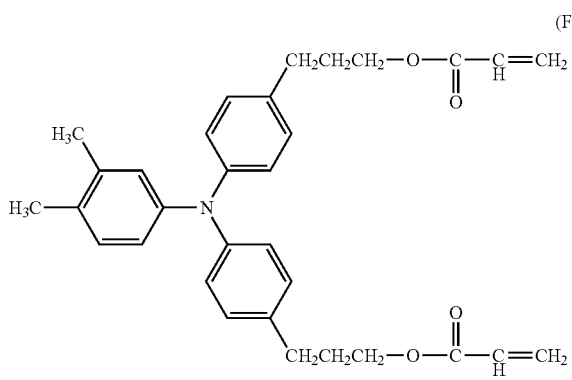
(F)

The coating liquid for a surface layer was applied onto the charge-transporting layer by dip coating to form a coat. The resultant coat was dried for 5 minutes at 50° C. Next, under a nitrogen atmosphere, the coat was irradiated with electron beams for 1.5 seconds under the conditions of an acceleration voltage of 70 kV and a beam current of 5.0 mA while the support (irradiated body) was rotated at a speed of 200 rpm, and then the temperature of the coat was increased from 25° C. to 120° C. over 15 seconds to cure the coat. The absorbed dose of the electron beams at this time was measured to be 15 kGy, and an oxygen concentration during a time period from the electron beam irradiation to the subsequent heating treatment was 16 ppm or less. Next, in the atmosphere, the coat was naturally cooled until its temperature became 25° C., and then a heating treatment was performed for 15 minutes at 100° C. to form a surface layer (protective layer) having a thickness of 5 μm.

Thus, an electrophotographic photosensitive member before depressed portion formation having a protective layer was produced.

Next, a mold member (mold) was placed in a pressure-contact shape transfer processing apparatus, and the produced electrophotographic photosensitive member before depressed portion formation was subjected to surface processing.

Figure 4A:
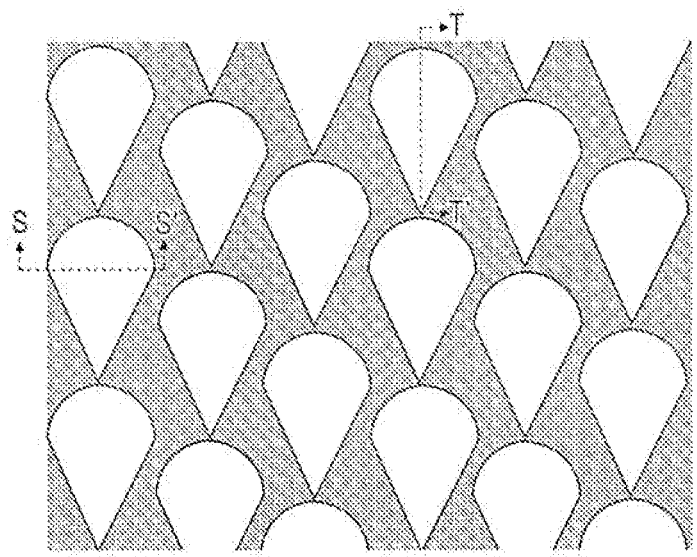
FIG. 4A is a top view for illustrating a mold for forming depressed portions used in Examples and Comparative Examples of the present disclosure.
Figure 4B:
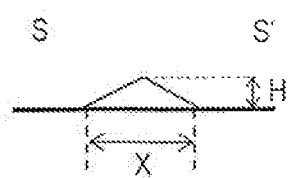
FIG. 4B is a cross-sectional view of a cross-section, taken along the line S-S' of FIG. 4A, of the mold for forming depressed portions used in Examples and Comparative Examples of the present disclosure.
Figure 4C:
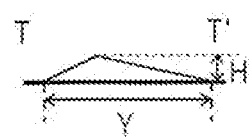
FIG. 4C is a cross-sectional view of a cross-section, taken along the line T-T' of FIG. 4A, of the mold for forming depressed portions used in Examples and Comparative Examples of the present disclosure.

Specifically, a mold illustrated in FIG. 4A to FIG. 4C was placed in a pressure-contact shape transfer processing apparatus roughly having the construction illustrated in FIG. 3, and the produced electrophotographic photosensitive member before depressed portion formation was subjected to surface processing. FIG. 4A to FIG. 4C are views for illustrating the mold used in Examples and Comparative Examples, FIG. 4A is a top view for schematically illustrating the mold, FIG. 4B is a schematic cross-sectional view of a projection of the mold in the axial direction of the electrophotographic photosensitive member (cross-sectional view of a cross-section taken along the line S-S' of FIG. 4A), and FIG. 4C is a cross-sectional view of a projection of the mold in the circumferential direction of the electrophotographic photosensitive member (cross-sectional view of a cross-section taken along the line T-T' of FIG. 4A). The mold illustrated in FIG. 4A to FIG. 4C has projection shapes having a maximum width X (maximum width in the axial direction of the electrophotographic photosensitive member when a projection on the mold is viewed from above) of 50 μm, a maximum length Y (maximum length in the circumferential direction of the electrophotographic photosensitive member when a projection on the mold is viewed from above) of 75 μm, an area ratio of 56%, and a height H of 4

μm. The area ratio refers to the ratio of the area of the projections to the whole surface when the mold is viewed from above. At the time of the processing, the temperatures of the electrophotographic photosensitive member and the mold were controlled so that the temperature of the surface of the electrophotographic photosensitive member became 120° C., and while the electrophotographic photosensitive member and the pressurizing member were pressed against the mold at a pressure of 7.0 MPa, the electrophotographic photosensitive member was rotated in its circumferential direction to form depressed portions over the entire surface of the surface layer (circumferential surface) of the electrophotographic photosensitive member. Thus, an electrophotographic photosensitive member was produced.

The surface of the resultant electrophotographic photosensitive member was subjected to magnified observation with a 50× lens under a laser microscope (product name: X-100, manufactured by Keyence Corporation), and the depressed portions formed on the surface of the electrophotographic photosensitive member were observed. At the time of the observation, adjustments were made so that: there was no inclination in the longitudinal direction of the electrophotographic photosensitive member; and the vertex of the circular arc of the electrophotographic photosensitive member in its circumferential direction was in focus. Images obtained by the magnified observation were connected to each other with an image connection application to obtain a square region measuring 500 μm on each side. Then, for the obtained result, image-processed height data was selected and filter processing was performed with a filter type median through the use of image analysis software included with the microscope.

The results of the observation were as follows: the depressed portions had a depth of 2 μm, a width of an opening in the axial direction of 50 μm, a length of the opening in the circumferential direction of 75 μm, and an area of 140,000 μm². The area refers to the area of the depressed portions when the surface of the electrophotographic photosensitive member is viewed from above, and means the area of the openings of the depressed portions.

Examples 2 to 12

Electrophotographic photosensitive members were produced in the same manner as in Example 1 except that the compound represented by the formula (1) contained in the coating liquid for a surface layer was changed from Exemplified Compound (1-4) to respective exemplified compounds shown in Table 1.

TABLE 1

| | Hole-transportable compound having chain-polymerizable functional group | Compound represented by formula (1) | (Wb/Mb)/ {(Wa/Ma) + (Wb/Mb)} |
|---|---|---|---|
| Example 1 | (F) | 1-4 | 0.25 |
| Example 2 | (F) | 1-5 | 0.25 |
| Example 3 | (F) | 1-7 | 0.25 |
| Example 4 | (F) | 1-14 | 0.25 |
| Example 5 | (F) | 1-12 | 0.25 |
| Example 6 | (F) | 1-8 | 0.25 |
| Example 7 | (F) | 1-15 | 0.25 |
| Example 8 | (F) | 1-19 | 0.25 |
| Example 9 | (F) | 1-1 | 0.25 |
| Example 10 | (F) | 1-3 | 0.25 |
| Example 11 | (F) | 1-10 | 0.25 |
| Example 12 | (F) | 1-25 | 0.25 |
| Example 13 | (G) | 1-4 | 0.25 |
| Example 14 | (H) | 1-4 | 0.25 |
| Example 15 | (I) | 1-4 | 0.25 |
| Example 16 | (F) | 1-4 | 0.03 |
| Example 17 | (F) | 1-4 | 0.55 |
| Comparative Example 1 | (G) | — | — |
| Comparative Example 2 | (G) | (C-1) | 0.25 |
| Comparative Example 3 | (G) | (C-2) | 0.25 |
| Comparative Example 4 | (G) | (C-3) | 0.25 |

Examples 13 to 15

Electrophotographic photosensitive members were produced in the same manner as in Example 1 except that the hole-transportable compound having a chain-polymerizable functional group contained in the coating liquid for a surface layer was changed from the compound represented by the formula (F) to compounds represented by the following formulae (G) to (I), respectively.

(G)

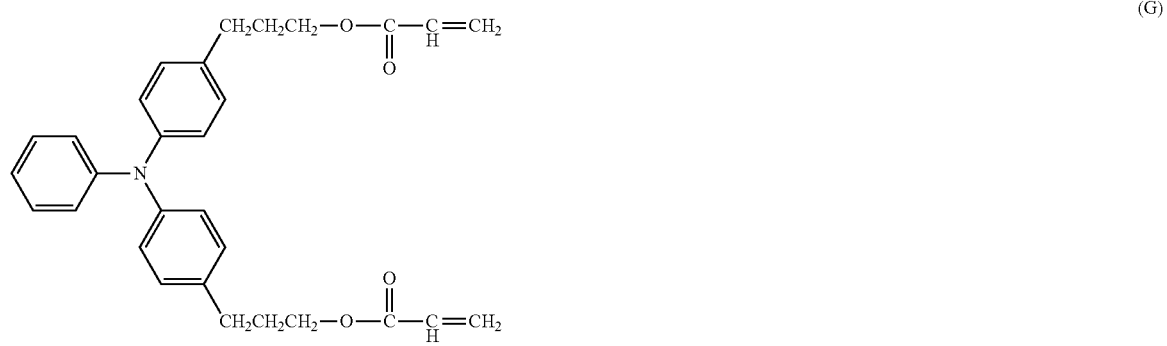

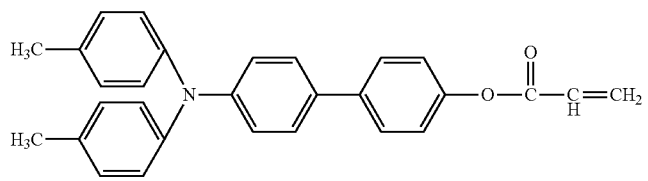
(H)

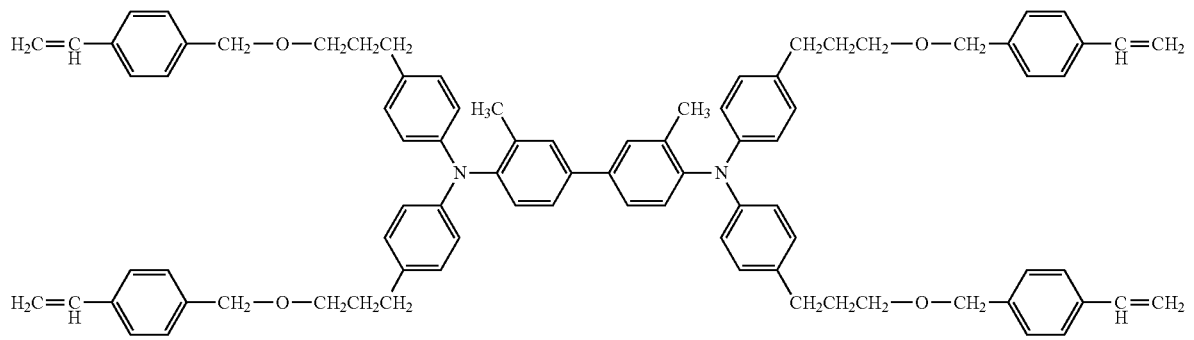
(I)

Example 16

An electrophotographic photosensitive member was produced in the same manner as in Example 1 except that the amounts of the compounds were changed so that the (Wb/Mb)/{(Wa/Ma)+(Wb/Mb)} in the coating liquid for a surface layer became 0.03.

Example 17

An electrophotographic photosensitive member was produced in the same manner as in Example 1 except that the amounts of the compounds were changed so that the (Wb/Mb)/{(Wa/Ma)+(Wb/Mb)} in the coating liquid for a surface layer became 0.55.

Comparative Example 1

An electrophotographic photosensitive member was produced in the same manner as in Example 13 except that Exemplified Compound (1-4) was not used in the coating liquid for a surface layer.

Comparative Examples 2 to 4

Electrophotographic photosensitive members were produced in the same manner as in Example 13 except that the compound represented by the formula (1) contained in the coating liquid for a surface layer was changed from Exemplified Compound (4) to compounds represented by the following formulae (C-1) to (C-3), respectively.

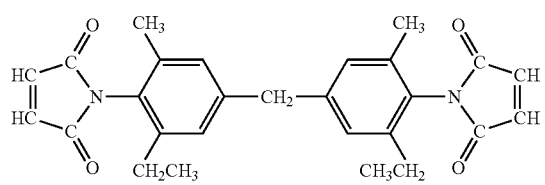
(C-1)

$$H_2C=\underset{H}{C}-\overset{O}{\underset{\|}{C}}-O-(CH_2)_6-O-\overset{O}{\underset{\|}{C}}-\underset{H}{C}=CH_2$$
(C-2)

(C-3)
(maleimide)—N—CH₂CH₂CH₂CH₂CH₂CH₃

[Evaluations]

The electrophotographic photosensitive member produced in each of Examples and Comparative Examples was mounted onto a cyan station of a reconstructed machine of an electrophotographic apparatus (copying machine) (product name: imageRunner (trademark)-ADV C5255, manufactured by Canon Inc.) serving as an evaluation apparatus, and subjected to image evaluation and electric characteristic evaluation in an environment at 30° C. and 80% RH under conditions described below.

<Image Smearing Evaluation>

First, the total electric discharge current amount of a charging step was set to 60 μA, and a cassette heater (drum heater) in the apparatus was turned off. After that, image formation was continuously performed on 50,000 sheets using a test chart having an image percentage of 1%. After the completion of the image formation, power supply to the copying machine was cut off, and the copying machine was left to stand for 3 days. After having been left to stand for 3 days, power supply to the copying machine was resumed, and a lattice image and a letter image in which hiragana letters representing the sounds "i", "ro", and "ha" were repeated (Iroha image) were output on A4 lateral size paper.

The lattice image and Iroha image obtained after the continuous image formation on 50,000 sheets were evaluated as described below. In the present disclosure, Rank A and Rank B were each judged to indicate that a suppressing effect on image smearing was sufficiently obtained, and Rank C and Rank D were each judged to indicate that no suppressing effect on image smearing was obtained.

Rank A: Neither the lattice image nor the Iroha image is found to have an image defect.

Rank B: Part of the lattice image is blurred, and part of the Iroha image is pale. Rank C: The lattice image is partially lost, and the entirety of the Iroha image is pale.

Rank D: The entirety of the lattice image is lost, and the entirety of the Iroha image is pale.

<Wear Resistance Evaluation>

Image formation was continuously performed on 100,000 sheets using a test chart having an image percentage of 1% under the same conditions as above, and the wear amount (μm) of the electrophotographic photosensitive member was confirmed. In the present disclosure, when the wear amount was less than 1.0 μm, it was judged that there was no problem with the wear resistance of the electrophotographic photosensitive member.

<Electric Characteristic Evaluation>

Image formation was continuously performed on 10,000 sheets using a test chart having an image percentage of 1% under the same conditions as above, and a fluctuation in potential of the electrophotographic photosensitive member was examined. A value for "potential after 10,000 sheets-initial potential" of an image exposure portion VL was calculated as ΔVL. In the present disclosure, when the ΔVL was less than 20 V, it was judged that there was no problem with the electric characteristics of the electrophotographic photosensitive member.

The evaluation results of Examples 1 to 17 and Comparative Examples 1 to 4 are shown in Table 2.

TABLE 2

| | Image smearing rank after passing of 50,000 sheets | Wear amount after passing of 100,000 sheets (μm) | ΔVL after passing of 10,000 sheets (V) |
|---|---|---|---|
| Example 1 | A | 0.33 | 7 |
| Example 2 | A | 0.38 | 7 |
| Example 3 | A | 0.44 | 8 |
| Example 4 | A | 0.37 | 9 |
| Example 5 | A | 0.35 | 9 |
| Example 6 | A | 0.51 | 11 |
| Example 7 | A | 0.40 | 12 |
| Example 8 | A | 0.38 | 12 |
| Example 9 | A | 0.29 | 13 |
| Example 10 | A | 0.33 | 12 |
| Example 11 | A | 0.31 | 13 |
| Example 12 | A | 0.41 | 13 |
| Example 13 | A | 0.42 | 8 |
| Example 14 | A | 0.79 | 12 |
| Example 15 | A | 0.54 | 13 |
| Example 16 | B | 0.42 | 6 |
| Example 17 | A | 0.35 | 12 |
| Comparative Example 1 | D | 0.44 | 7 |
| Comparative Example 2 | A | 0.62 | 22 |
| Comparative Example 3 | D | 0.38 | 9 |
| Comparative Example 4 | B | 1.22 | 10 |

The results of the evaluations revealed that, in each of Examples, the suppressing effect on image smearing at the time of repeated use was sufficiently obtained, and there was no problem with the wear resistance and the electric characteristics.

In each of Comparative Examples 1 and 3, the suppressing effect on image smearing at the time of repeated use was not sufficiently obtained. In Comparative Example 2, there was a problem with the electric characteristics after passing of 10,000 sheets. In Comparative Example 4, there was a problem with the wear resistance after passing of 100,000 sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099069, filed May 23, 2018, which is hereby incorporated by reference herein in its entirety.

What is claimed is:

1. An electrophotographic photosensitive member comprising in this order:
   a support; and
   a photosensitive layer, wherein
   a surface layer of the electrophotographic photosensitive member contains a copolymer of a hole-transportable compound having a chain-polymerizable functional group and a compound represented by formula (1)

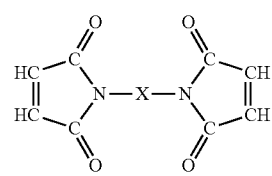

(1)

where X represents a divalent group obtained by removing two hydrogen atoms from a hydrocarbon having 2 to 18 carbon atoms.

2. The electrophotographic photosensitive member according to claim 1, wherein the hydrocarbon has 6 to 18 carbon atoms.

3. The electrophotographic photosensitive member according to claim 1, wherein the hydrocarbon comprises a saturated hydrocarbon.

4. The electrophotographic photosensitive member according to claim 3, wherein the saturated hydrocarbon comprises a chain saturated hydrocarbon.

5. The electrophotographic photosensitive member according to claim 4, wherein the chain saturated hydrocarbon has 6 to 12 carbon atoms.

6. The electrophotographic photosensitive member according to claim 5, wherein the compound represented by formula (1) comprises a compound represented by formula (2)

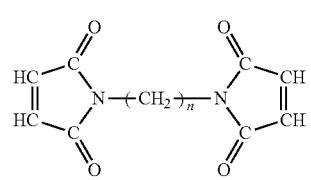

(2)

where n represents an integer of 6 to 12.

7. The electrophotographic photosensitive member according to claim 1, wherein the chain-polymerizable functional group is selected from an acryloyloxy group and a methacryloyloxy group.

8. The electrophotographic photosensitive member according to claim 1, wherein the hole-transportable compound comprises two of the chain-polymerizable functional groups.

9. The electrophotographic photosensitive member according to claim 1, wherein $0.05 \leq (Wb/Mb)/\{(Wa/Ma)+(Wb/Mb)\} \leq 0.50$, where Wa and Ma respectively represent a mass and a molecular weight, of the hole-transportable compound contained in the copolymer, and Wb and Mb respectively represent a mass and a molecular weight of the compound represented by formula (1) contained in the copolymer.

10. A method for producing an electrophotographic photosensitive member comprising in this order:
providing a support;
forming a photosensitive layer; and
forming a surface layer, wherein
forming the surface layer comprises
preparing a coating liquid for the surface layer containing a hole-transportable compound having a chain-polymerizable functional group and a compound represented by formula (1)

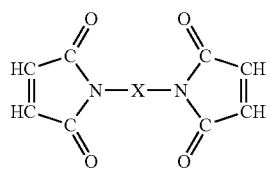

(1)

where X represents a divalent group obtained by removing two hydrogen atoms from a hydrocarbon having 2 to 18 carbon atoms,
forming a coat of the coating liquid, and
curing the coat to form the surface layer.

11. The method for producing an electrophotographic photosensitive member according to claim 10, wherein the compound represented by formula (1) comprises a compound represented by formula (2)

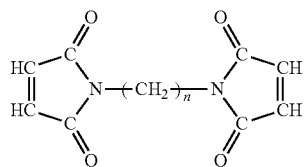

(2)

where n represents an integer of 6 to 12.

12. The method for producing an electrophotographic photosensitive member according to claim 10, wherein $0.05 \leq (Wb/Mb)/\{(Wa/Ma)+(Wb/Mb)\} \leq 0.50$, where Wa and Ma respectively represent a mass and a molecular weight, of the hole-transportable compound contained in the coating liquid, and Wb and Mb respectively represent a mass and a molecular weight of the compound represented by formula (1) contained in the coating liquid.

13. A process cartridge comprising:
an electrophotographic photosensitive member including a support and a photosensitive layer in the stated order;
at least one unit selected from the group consisting of a charging unit, a developing unit, and a cleaning unit; and
the process cartridge integrally supporting the electrophotographic photosensitive member and the at least one unit, and being removably mounted onto a main body of an electrophotographic image-forming apparatus, wherein
a surface layer of the electrophotographic photosensitive member contains a copolymer of a hole-transportable compound having a chain-polymerizable functional group and a compound represented by formula (1)

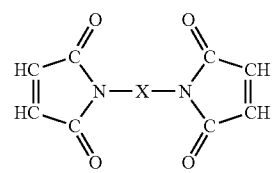

(1)

where X represents a divalent group obtained by removing two hydrogen atoms from a hydrocarbon having 2 to 18 carbon atoms.

14. An electrophotographic image-forming apparatus comprising:
an electrophotographic photosensitive member including a support and a photosensitive layer in the stated order; and
at least one unit selected from the group consisting of a charging unit, an exposing unit, a developing unit, and a transferring unit, wherein
a surface layer of the electrophotographic photosensitive member contains a copolymer of a hole-transportable compound having a chain-polymerizable functional group and a compound represented by formula (1)

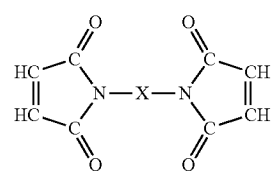

(1)

where X represents a divalent group obtained by removing two hydrogen atoms from a hydrocarbon having 2 to 18 carbon atoms.

* * * * *